(12) United States Patent
Sun et al.

(10) Patent No.: US 7,474,496 B1
(45) Date of Patent: Jan. 6, 2009

(54) MICRO ACTUATOR DC GAIN CALIBRATION SCHEME FOR HDD DUAL-STAGE ACTUATOR SYSTEMS

(75) Inventors: Yu Sun, Fremont, CA (US); Xiaoping Hu, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 132 days.

(21) Appl. No.: 11/429,427

(22) Filed: May 5, 2006

Related U.S. Application Data

(60) Provisional application No. 60/678,419, filed on May 6, 2005.

(51) Int. Cl.
*G11B 5/596* (2006.01)
*G11B 15/18* (2006.01)

(52) U.S. Cl. .................. 360/78.05; 360/69; 360/75
(58) Field of Classification Search .................. None
See application file for complete search history.

(56) References Cited

U.S. PATENT DOCUMENTS 6,342,987 B1 * 1/2002 Hattori et al. ............ 360/78.05
6,546,296 B1 * 4/2003 Hara ........................... 700/37
7,012,780 B1 * 3/2006 Hu et al. ................... 360/78.05
7,075,748 B2 * 7/2006 White et al. ............... 360/78.05
7,106,547 B1 9/2006 Hargarten et al. ......... 360/77.04

* cited by examiner

*Primary Examiner*—Jason C Olson
(74) *Attorney, Agent, or Firm*—Westman, Champlin & Kelly, P.A.

(57) ABSTRACT

A servo system for a hard disk drive comprising a first actuator, a second actuator, a head, and a disk on which is formed a plurality of tracks containing servo data. The servo system comprises a first stimulus, a second stimulus, and a calibration system. The first stimulus causes the first actuator to move the head to at least two calibration tracks on the disk. The second stimulus causes the second actuator to move the head relative to the at least two calibration tracks. The calibration system generates a calibration factor based on the second calibration signal and the movement of the second actuator relative to each of the at least two calibration tracks.

63 Claims, 5 Drawing Sheets

MICRO ACTUATOR DC GAIN CALIBRATION SCHEME FOR HDD DUAL-STAGE ACTUATOR SYSTEMS

RELATED APPLICATIONS

Priority is claimed from U.S. Provisional Application Ser. No. 60/678,419 filed on May 6, 2005, which is incorporated by reference in its entirety.

FIELD OF THE INVENTION

The present invention relates to digital storage devices and, more particularly, to systems and methods of calibrating the gain of the second stage of dual-stage actuator systems for hard disk drives.

BACKGROUND OF THE INVENTION

A disk drive is a digital data storage device that stores information on concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned adjacent to a desired track of the disk while the disk is spinning.

Writing is performed by delivering a polarity-switching write current signal to the magnetic transducer while the transducer is positioned adjacent to the desired track. The write signal creates a variable magnetic field at a gap portion of the magnetic transducer that induces magnetically polarized transitions on the desired track. The magnetically polarized transitions are representative of the data being stored.

Reading is performed by sensing the magnetically polarized transitions on a track with the magnetic transducer. As the disk spins adjacent to the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk. In a seek mode, the transducer is moved radially inwardly or outwardly to arrange the transducer above a desired track. In an on-track mode, the transducer reads data from or writes data to the desired track. The tracks are typically not completely circular. Accordingly, in the on-track mode the transducer must be moved radially inwardly and outwardly to ensure that the transducer is in a proper position relative to the desired track. The movement of the transducer in on-track mode is referred to as track following.

Modern hard disk drives employ a dual-actuator system for moving the transducer radially relative to the disk. A first stage of a dual-actuator system is optimized for moving the transducer relatively large distances. A second stage of a dual-actuator system is optimized for moving the transducer relatively small distances. The present invention relates to hard disk drives having dual-stage actuator systems.

Figures 1, 2:
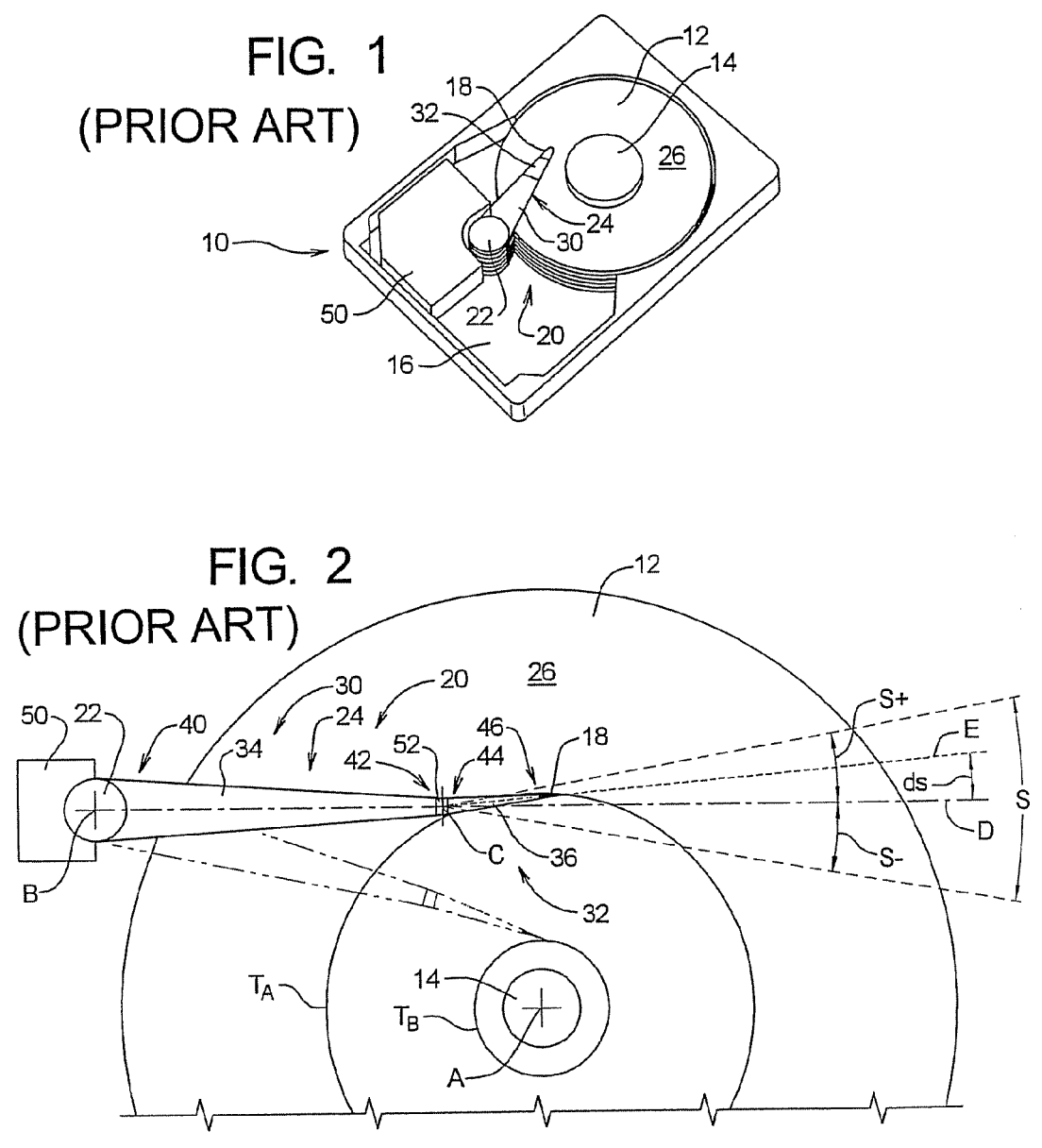

FIGS. 1 and 2 depict a mechanical portion of an example disk drive 10. The disk drive 10 further comprises control electronics typically including a preamplifier, a read/write channel, a servo control unit, a random access memory (RAM), and read only memory (ROM), spindle motor, and dual-stage driving electronics. The electronic portion is or may be conventional and will not be described herein beyond what is necessary for a complete understanding of the present invention.

FIGS. 1 and 2 show that the mechanical portion of the disk drive 10 includes a disk 12 that is rotated by a spin motor 14. The spin motor 14 is mounted to a base plate 16. The disk drive 10 includes at least one and typically a plurality of disks 12, each with one or two recording surfaces. During use, the disk 12 is rotated about a spindle axis A. The term "cylinder" is often used to refer to the tracks on each of the recording surfaces that are located at the same radial distance from the spindle axis.

The disk drive 10 further comprises what is commonly referred to as a head 18. The head 18 comprises or supports the magnetic read/write transducer described above; the head 18 will be referred to herein as the component of the disk drive 10 that reads data from and writes data to the disk 12.

FIGS. 1 and 2 further illustrate a positioning system 20 of the disk drive 10. The positioning system 20 comprises a bearing assembly 22 that supports at least one actuator arm assembly 24. The actuator arm assembly 24 supports the head 18 adjacent to one recording surface 26 of one of the disks 12. Typically, the bearing assembly 22 will support one actuator arm assembly 24 and associated head 18 adjacent to each of the recording surfaces 26 of each of the disks 12. The actuator arm assemblies 24 allow each head 18 to be moved as necessary to seek to a desired track 27 in seek mode and then follow the desired track 27 in track following mode.

Typically, the actuator arm assemblies 24 are fixed relative to each other; the positioning system 20 thus moves at least a portion of the actuator arm assemblies 24 together. In this case, all of the actuator arm assemblies 24 will be located adjacent to the same track on each of the recording surfaces, or, stated alternatively, at the same cylinder.

The positioning system 20 depicted in FIGS. 1 and 2 is a dual-stage system. Accordingly, each actuator arm assembly 24 comprises a first actuator structure 30 and a second actuator structure 32. For ease of illustration, FIGS. 1 and 2 depict the first and second actuator structures 30 and 32 as comprising first and second elongate actuator arms 34 and 36, respectively, and the actuator structures 30 and 32 may be implemented as shown in FIGS. 1 and 2.

The actuator structures 30 and 32 may, however, be implemented using other structures or combinations of structures. For example, the first actuator structure 30 may comprise an elongate arm that rotates about a first axis B, while the second actuator structure 32 may comprise a suspension assembly rigidly connected to a distal end of the first actuator. In this case, the first actuator is able to rotate about an actuator axis, while the head 18 would be suspended from the second actuator for linear movement along the disk radius relative to the position of the first actuator. The actuator structures 30 and 32 may thus take any number of physical forms, and the scope of the present invention should not be limited to the exemplary actuator structures 30 and 32 depicted in FIGS. 1 and 2.

Conventionally, the bearing assembly 22 is also considered part of the first actuator structure 30. In particular, the bearing assembly 22 supports a proximal end 40 of the first actuator arm 34 for rotation about a first axis B, while a distal end 42 of the first actuator arm 34 supports a proximal end 44 of the second actuator arm 36 for rotation about a second axis C. In this case, the head 18 is supported on a distal end 46 of the second actuator arm 36.

FIG. 2 also illustrates that the exemplary actuator structures 30 and 32 of the positioning system 20 form part of a first actuator 50 and a second actuator 52. For the purposes of the following discussion, the first actuator 50 is identified as a voice coil motor (VCM) and the second actuator 52 is identified as a piezoelectric transducer (PZT). However, the actuators 50 and 52 may be formed by any device capable of movement in response to an electrical control signal as will be described below.

In particular, based on a first actuator control signal, the first actuator 50 moves the first actuator arm 34 to change an angular position of the head 18 relative to the first axis B. The second actuator 52 is supported by the distal end 42 of the first actuator structure 30 to rotate the head 18 about the second axis C based on a second actuator control signal. In FIG. 2, an angular position of the first actuator arm 34 is represented by reference character D, while an angular position of the second actuator arm 36 is represented by reference character E.

A range of movement "S" associated with the second actuator structure 32 is defined by the stroke "s+" and "s−" in either direction relative to a neutral position D defined by the first actuator arm 34. The term "actual displacement" (ds in FIG. 2) refers to the angular difference at any point in time of the head 18 relative to the neutral position as defined by the position D of the first actuator structure 30. When the head 18 is in the neutral position, the actual displacement of the second actuator arm 36 is zero.

FIG. 2 further identifies arbitrary first and second tracks $T_A$ and $T_B$ on the disk 12. The actuator arm assembly 24 is shown in an initial position by solid lines and in a target position by broken lines; the first track $T_A$ will thus be referred to as the "initial track" and the second track $T_B$ will be referred to as the "target track". It should be understood that the terms "initial track" and "target track" are relative to the position of the head 18 before and after a seek operation. Any track 27 on the disk 12 may be considered the initial track or the target track depending upon the state of the disk drive 10 before and after a particular seek operation.

FIG. 3 contains a block diagram of a servo system 60 incorporating a conventional two-stage actuator system. The servo system 60 will typically be embodied as a software program running on a digital signal processor, but one of ordinary skill in the art will recognize that control systems such as the servo system 60 described herein could be implemented in hardware.

The servo system 60 comprises a first stage 62 and a second stage 64. As described above, the disk 12 defines a plurality of tracks 27 in the form of generally concentric circles centered about a spindle axis C. The first stage 62 controls the VCM 50 and the second stage 64 controls the PZT 52 to support the head 18 adjacent to a desired one of the tracks 27. The first and second actuator control signals are generated as part of this larger servo system 60.

More specifically, an input signal "R" is combined with a position error signal "PES" by a first summer 70. The second stage position signal $Y_2$ is indicative of an actual position of the actuator 52 of the second stage 64, and a second stage position estimate signal "$Y_{2est}$" is indicative of an estimated position of the actuator 52 of the second stage 64. The second summer 72 combines the second stage position estimate signal "$Y_{2est}$" and the output of the first summer 70. A first stage position signal "$Y_1$" is indicative of the actual position of the first actuator 50 of the first stage 62. A third summer 74 combines the first and second stage position signals "$Y_1$" and "$Y_2$". System disturbances "d" are represented as an input to the third summer 74. The position error signal "PES" thus represents the combination of the first and second position signals "$Y_1$" and "$Y_2$" with any system disturbances "d".

The source of the input signal "R" and the first and second stage position signals "$Y_1$" and "$Y_2$" is or may be conventional and will be described herein only to the extent necessary for a complete understanding of the present invention. As will be described in further detail below, each of the tracks T contains data sectors containing stored data and servo sectors containing servo data. The servo data identifies each individual track T to assist in seek operations and is also configured to allow adjustment of the radial position of the head 18 during track following. As is conventional, a servo demodulation unit generates the position error signal "PES" and the first and second stage position signals "$Y_1$" and "$Y_2$" based on the servo data read from the disk 12. The input signal "R" is generated by a host computer or is simply zero during track following.

Referring now back to the servo system 60, the overall bandwidth of the system 60 is determined by the second stage 64. The gain variation of the second stage 64 thus directly affects the bandwidth and stability margins of the entire system 60. The need thus exists to calibrate the gain of the second stage 64 to improve drive performance (consistent system bandwidth) and reliability (consistent stability margins, accurate screening during the self-test).

However, PES non-linearities can adversely affect conventional methods of calibrating the gain of the second stage 64. In particular, a conventional method of measuring the gain of the second stage 64 is to operate the first stage 62 to perform a track follow operation on a particular track while applying a calibration signal of known amplitude the second stage 64. The calibration signal is predetermined to cause movement of the second actuator arm 36 relative to the position D of the first actuator arm 34 equal to approximately one-half the width of the track. By monitoring the servo data read by the head 18 while the calibration signal is applied to the second stage 64, the actual displacement of the second actuator arm 36 relative to the position D can be measured.

The relationship between the calibration signal, the PES signal, and the actual displacement of the second actuator structure 32 during calibration thus allows a calibration factor to be generated for a particular positioning system. The PES signal is thus an important factor when calibrating the second stage 64, and PES non-linearities adversely affect the ability of the positioning system to generate an accurate calibration factor.

The inventors have recognized that one important cause of PES non-linearities is the configuration of the servo sectors formed on the recording surfaces. In particular, referring now to FIG. 4, depicted therein is a somewhat simplified schematic representation of three adjacent tracks $T_X$, $T_Y$, and $T_Z$. The track $T_X$ is the outermost track on the recording surface in the example depicted in FIG. 4. The track $T_Y$ is radially adjacent to the track $T_X$ but is located inwardly of the track $T_X$, while the track $T_Z$ is radially adjacent to the track $T_Y$ but is located inwardly thereof.

As shown in FIG. 4, a plurality of data sectors 120 is associated with each of the tracks $T_X$, $T_Y$, and $T_Z$, and between each of the data sectors 120 is a servo sector 122. As generally discussed above, the servo sectors 122 contain the servo data that allows the position of the head 18 to be determined for seek operations and accurate track following.

More specifically, each of the example servo sectors 122 comprises a plurality of A bursts 130, B bursts 132, C bursts 134, and D bursts 136. The bursts 130-136 are formed in radial sequences 140, 142, 144, and 146, with one such radial sequence 140-146 of each of the servo bursts 130-136 associated with each of the tracks T. Each of the radial sequences 140-146 of servo bursts 130-136 may, however, be associated with more than one of the tracks T.

An A/B burst seam 150 is defined between each sequence 140 of A bursts 130 and the adjacent sequence 142 of B bursts 132. The A/B burst seams 150 extend along the tracks T and, ideally, define the centers of the tracks T. A C/D burst seam 152 is similarly defined between each sequence 144 of C bursts 134 and the adjacent sequence 146 of D bursts 136. The C/D burst seams 152 are typically offset from the A/B burst seams. The burst seams 150 and 152 ideally extend in a direction parallel to the tracks $T_X$, $T_Y$, and $T_Z$.

In addition, burst transitions are formed between the leading and trailing edges of circumferentially adjacent bursts. The example in FIG. 4 includes an A/B burst transition 154 formed between the trailing edge of each A burst 130 and the leading edge of the B burst 132 adjacent thereto. Similarly, a B/C burst transition 156 is formed between the trailing edge of each B burst 132 and the leading edge of each C burst 134 adjacent thereto. In the example shown in FIG. 4, a C/D burst transition 158 is also formed between the trailing edge of each C burst 134 and the leading edge of each D burst 136 adjacent thereto. The burst transitions 154-158 ideally extend in a direction perpendicular to the tracks $T_X$, $T_Y$, and $T_Z$.

FIG. 4 is only one example of a configuration of a servo sector. Servo sectors may contain a lesser or greater number of servo bursts than the four servo bursts depicted in FIG. 4. In addition, the servo bursts may be formed in different patterns. However, burst seams that extend parallel to the track direction and burst transitions that extend perpendicular to the track direction will typically be defined between adjacent servo bursts.

It should be noted that FIG. 4 is highly idealized in that the various bursts are perfectly aligned with each of the burst seams 150 and 152 and burst transitions 154-158. In practice, servo bursts are often not perfectly aligned with the burst seams 150 and 152 and/or the burst transitions 154-158. For example, FIG. 5 depicts a situation in which the trailing edges of the A bursts 130 associated with the track $T_X$ overlap the leading edges of the B bursts 132 associated with that track $T_Y$ at the A/B burst transitions 154. The trailing edges of the A bursts associated with the track $T_X$, on the other hand, are spaced from the leading edges of the B bursts associated with that track $T_Z$ at the A/B burst transitions 154.

Although FIG. 5 depicts a simplified example in which problems occur only at the A/B burst transitions 154, similar problems may occur at the B/C burst transitions 156, at the C/D burst transitions 158, at the A/B burst seams 150, and at the C/D burst seams 152. Burst misalignment such as is depicted in FIG. 5 will be referred to herein as burst alignment anomalies.

As is well-known in the art, the servo bursts are formed by specialized factory formatting equipment during what is referred to as a low-level disk format process. In particular, before the low-level disk format process is performed, the disk is blank and contains no information of any kind. To allow the hard disk drive to be used, the factory formatting equipment initially writes servo bursts to the blank disk surface.

As one example of the low-level format process, the outermost radial sequence of servo bursts associated with the outermost track (e.g., sequence 140 of D bursts 136 associated with the first track $T_X$ in FIG. 4) may first be written to the disk. If the low-level format process starts at the outermost edge of the recording surface, the servo bursts located radially inwardly of the outermost servo bursts (e.g., sequence 142 of A bursts 130 associated with the track $T_X$ in FIG. 4) are next written to the disk in a second radial sequence. This process is repeated by forming successive radial sequences of servo bursts, while moving towards the spindle, until all of the radial sequences of servo bursts have been written.

Burst alignment anomalies may be, and often are, created during the low-level disk format process. The inventors have further recognized that, because of the sequential nature in which servo bursts are written during the low-level disk format process, burst alignment anomalies tend to be consistent along burst seams and/or burst transitions between adjacent radial burst sequences and tend to vary from one burst seam and/or burst transition to another radially-spaced burst seam and/or transition.

In particular, referring for a moment back to FIG. 5, in that example, the spacing between the trailing edges of the A bursts 130 and the leading edges of the B bursts 132 associated with the first track $T_X$ is consistent along the track $T_X$. Similarly, the spacing between the trailing edges of the A bursts 130 and the leading edges of the B bursts 132 associated with the second track $T_Y$ is consistent along that track $T_Y$. However, a comparison of the relative locations of the A bursts and B bursts of the first and second tracks $T_X$ and $T_Y$ illustrates that the burst alignment anomalies associated with these tracks $T_X$ and $T_Y$ differ.

In the context of calibrating the gain of the second stage 64, the inventors have further recognized that, because burst alignment anomalies tend to be consistent along burst seams and/or at burst transitions at adjacent radial burst sequences, the non-linearities in the PES will be consistent for a particular track. Accordingly, if the second stage is calibrated while following a particular track, the consistency of the burst alignment anomalies in that particular track creates a consistent, unknown non-linearity in the PES that cannot be eliminated by averaging, prediction, or other post-processing of the PES signal.

A need thus exists for improved positioning systems and methods for a dual-stage actuator of a disk drive and, in particular, for improved calibration systems and methods for the second stage of such positioning systems and methods.

SUMMARY OF THE INVENTION

The present invention may be embodied as a servo system for a hard disk drive comprising a first actuator, a second actuator, a head, and a disk on which is formed a plurality of tracks containing servo data. The servo system comprises a first stimulus, a second stimulus, and a calibration system. The first stimulus causes the first actuator to move the head to at least two calibration tracks on the disk. The second stimulus causes the second actuator to move the head relative to the at least two calibration tracks. The calibration system generates a calibration factor based on the second calibration signal and the movement of the second actuator relative to each of the at least two calibration tracks.

The present invention may also be implemented as a method of is calibrating the second stage of a dual-stage actuator. In particular, in a hard disk drive comprising a first actuator, a second actuator, a head, and a disk on which is formed a plurality of tracks containing servo data, the present invention may be embodied as method of calibrating a gain of the second actuator comprising the following steps. A first stimulus is applied to the first actuator to move the head to at least two calibration tracks on the disk. A second stimulus is applied to the second actuator to move the head relative to the at least two calibration tracks. A calibration factor is generated based on the second calibration signal and the movement of the second actuator relative to each of the at least two calibration tracks.

BRIEF DESCRIPTION OF THE DRAWINGS

FIG. 1 is a perspective view of a mechanical portion of a hard disk drive;

FIG. 2 is a schematic representation of several of the components of the mechanical portion of the disk drive of FIG. 1;

DETAILED DESCRIPTION

Figure 3:
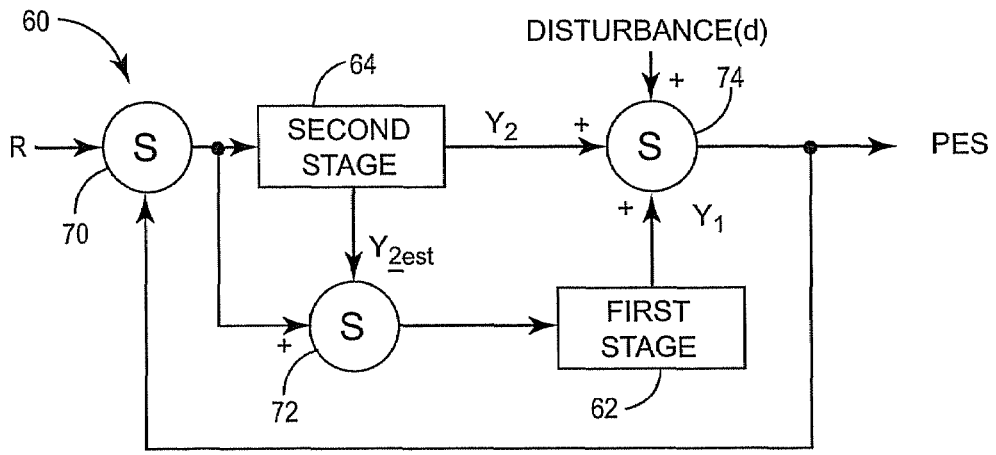
FIG. 3 is a block diagram depicting a control system used by a conventional servo system for a dual-stage actuator of a hard disk drive.
Figure 4:
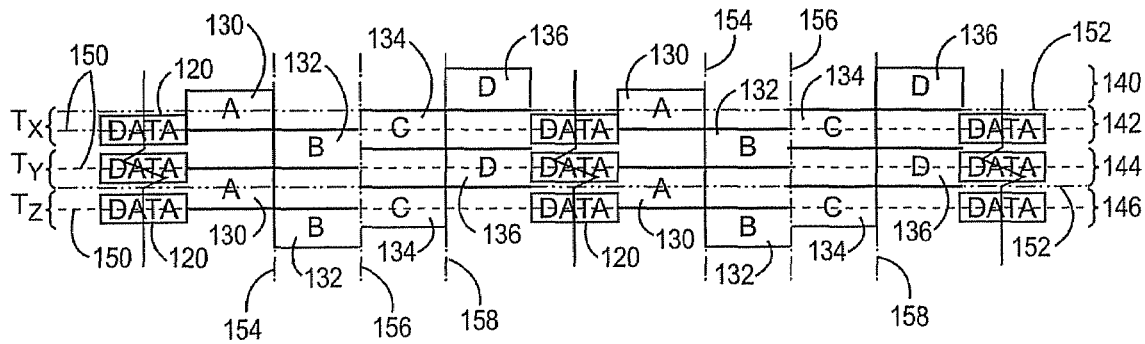
FIG. 4 is schematic diagram of the relationship among three example tracks formed on a recording surface under ideal conditions.
Figure 5:
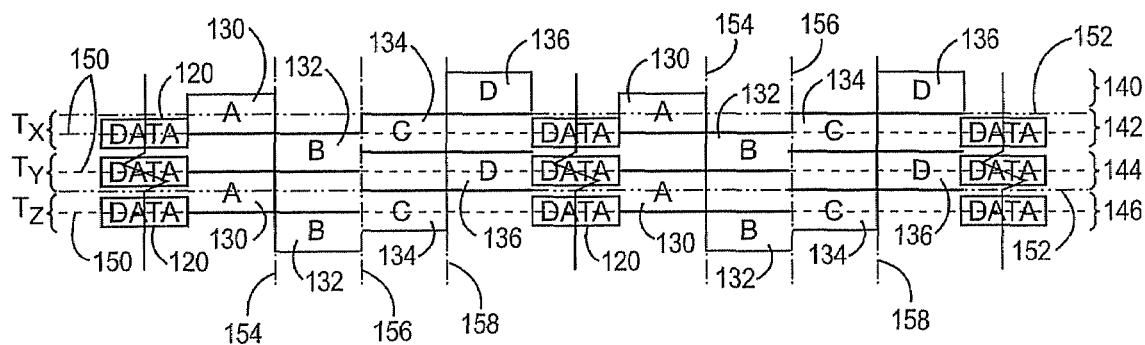
FIG. 5 is schematic diagram of the relationship among three example tracks formed on a recording surface under non-ideal conditions, illustrating examples of burst alignment anomalies.
Figure 6:
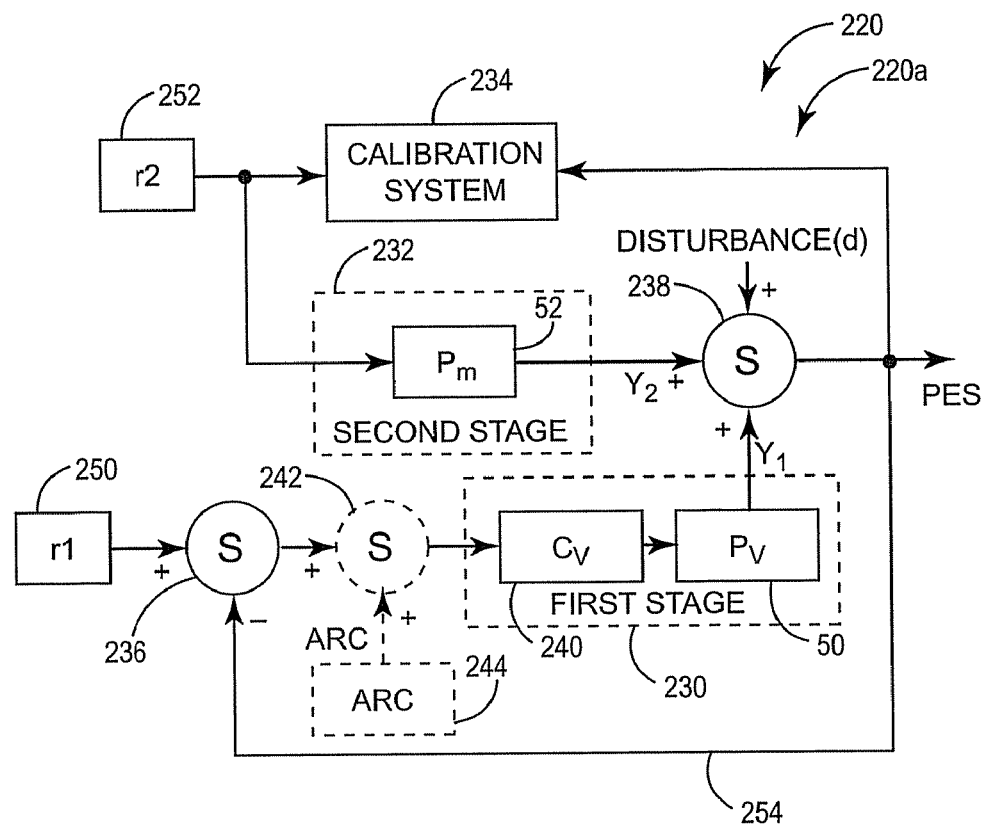
FIG. 6 is a block diagram depicting a servo system of the present invention in a calibration mode.
Figure 7:
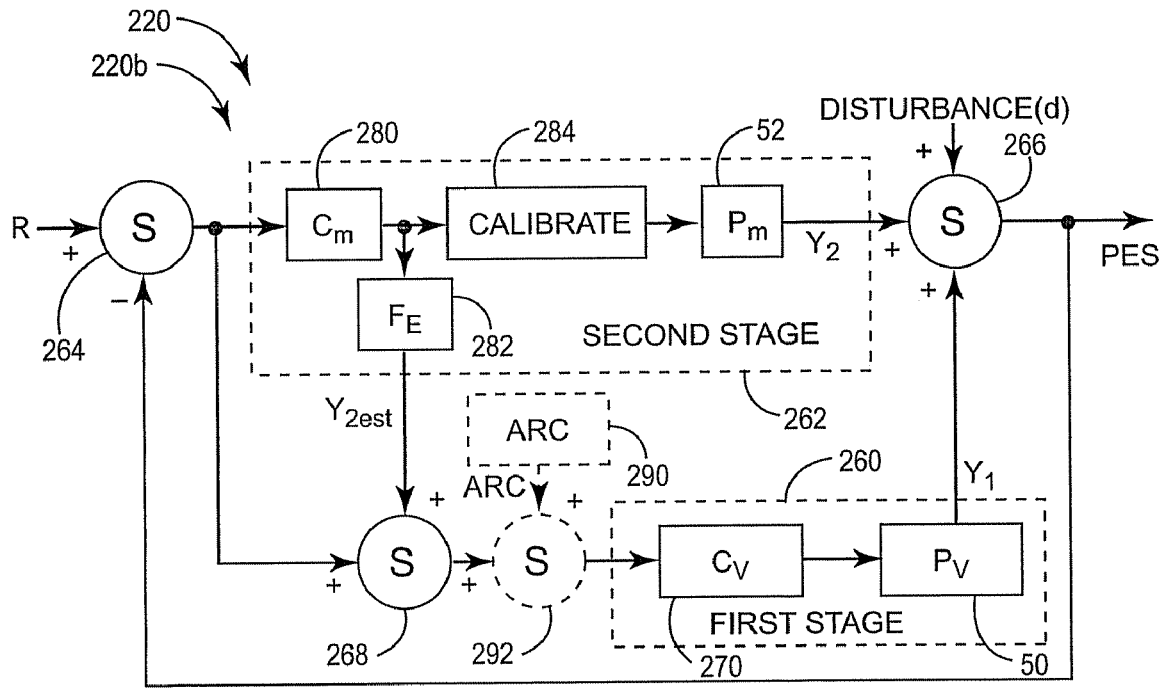
FIG. 7 is a block diagram depicting a servo system of the present invention in an operational mode.

Referring now to FIGS. 6 and 7 of the drawing, depicted therein is a servo system 220 constructed in accordance with, and embodying, the principles of the present invention. The exemplary servo system 220 operates in a calibration mode 220a as shown in FIG. 6 and in an operational (seek and read/write) mode 220b as shown in FIG. 7. The servo system 220 will typically be embodied as a software program running on a digital signal processor, but one of ordinary skill in the art will recognize that the servo system 220 described herein could be implemented in hardware.

In both the calibration mode 220a and the operating mode 220b, the servo system 220 comprises the first and second actuator structures 30 and 32 and first and second actuators 50 and 52 described above. As will be described in detail below, the servo system 220 further generates the first and second actuator control signals that cause the actuators 50 and 52 to move the actuator structures 30 and 32 as generally described above.

Referring for a moment more specifically to FIG. 6, when in the calibration mode 220a, the servo system 220 is configured to comprise first and second stages 230 and 232, a calibration system 234, and first and second summers 236 and 238. The example first stage 230 comprises a first controller 240 and the VCM 50. Optionally, a third summer 242 may be arranged between the first summer 236 and the controller 240 and an Adaptive Runout Compensation (ARC) system 244 (see U.S. patent application Ser. No. 10/318,316 filed Dec. 11, 2002 entitled "Method and Apparatus for Determining Embedded Runout Correction Values Using Feedback," which is incorporated herein by reference) applying an ARC signal to the third summer 242. In the calibration mode 220a, the example second stage 232 comprises the PZT 52.

The servo system 220 further comprises first and second signal sources 250 and 252 when operating in the calibration mode 220a. The first signal source 250 generates a first calibration signal "r1", and the second signal source 252 generates a second calibration signal "r2". The purpose and characteristics of the first and second calibration signals "r1" and "r2" will be described in further detail below.

During operation in the calibration mode 220a, first calibration source 250 applies the first calibration signal "r1" to the first summer 236. The output of the first summer 236 is applied to the first controller 240 of the first stage 230. The output of the first controller 240 is applied to the VCM 50. A signal "$Y_1$" indicative of a location of the first actuator 50 is applied to the second summer 238. The output of the second summer 238 is the PES signal, which is applied to the first summer 236 to form a closed loop 254. If used, the third summer 242 allows the parameters of the loop 254 to be altered based on the ARC signal generated by the ARC system 244, which is or may be conventional.

The second signal source 252 applies the second calibration signal "r2" to the calibration system 234 and to the PZT 52. A signal "$Y_2$" indicative of a location of the second actuator 52 is also applied to the second summer 238. The PES signal is applied to the calibration system 234. When the servo system 220 is in the calibration mode 220a, the second stage 232 is operated in an open loop mode. Based on the second calibration signal "r2" and the PES signal, the calibration system 234 generates a calibration factor for use by the servo system 220 in the operating mode 220b, as will be described in further detail below.

The first calibration signal "r1" is a position reference stimulus that controls the VCM 50 through the first stage 230. The first reference signal "r1" is predetermined to cause the VCM 50 to move the head 18 across a plurality of tracks T when the servo system 220 is in the calibration mode 220a. The second calibration signal "r2" is a generally conventional calibration stimulus that causes the head 18 to move within the width of the track passing under the head 18 at any given point in time.

When the servo system 220 operates in the calibration mode 220a, the head 18 will, at different points in time, be located over a plurality of tracks under the influence of the first calibration signal "r1" and located at different positions within any given one of this plurality of tracks under the influence of the second calibration signal "r2". Accordingly, with the servo system 220 operating under the influence of both the first calibration signal "r1" and the second calibration signal "r2", the PES signal is generated based on servo bursts associated with two or more radially spaced tracks.

Figure 8:
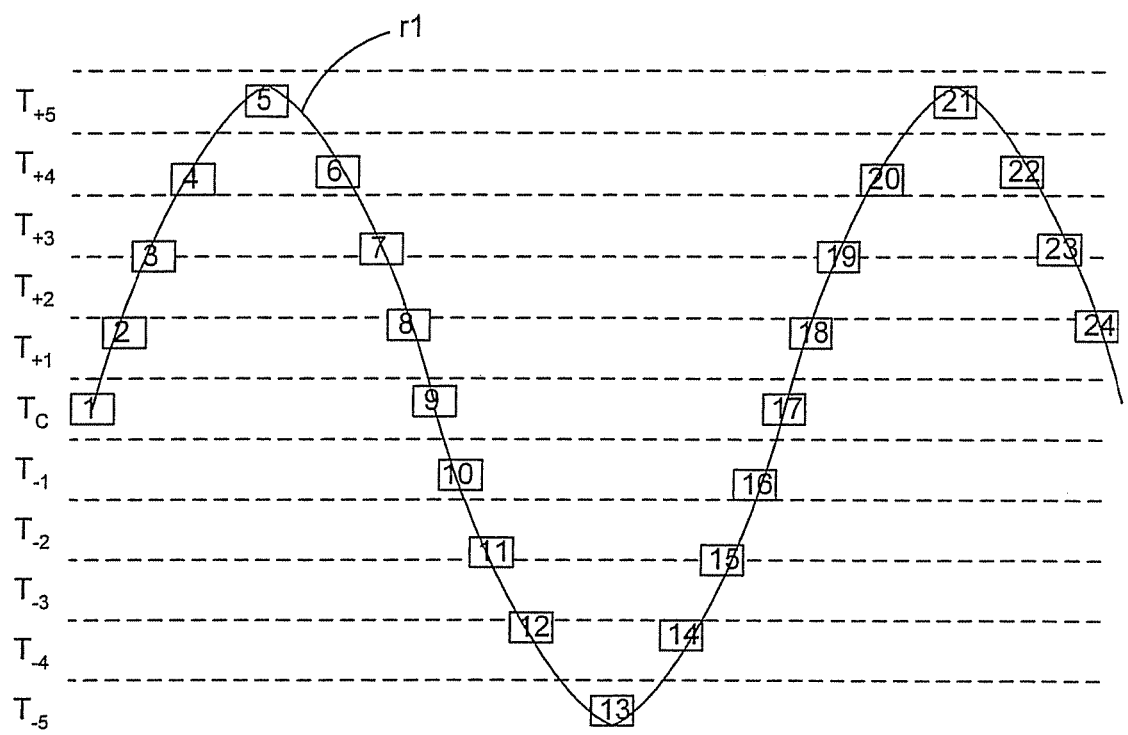
FIG. 8 is a plan view of a plurality of tracks, with movement of a head relative to the tracks schematically illustrated by a sequence of boxes indicating measurement locations.
Figure 9:
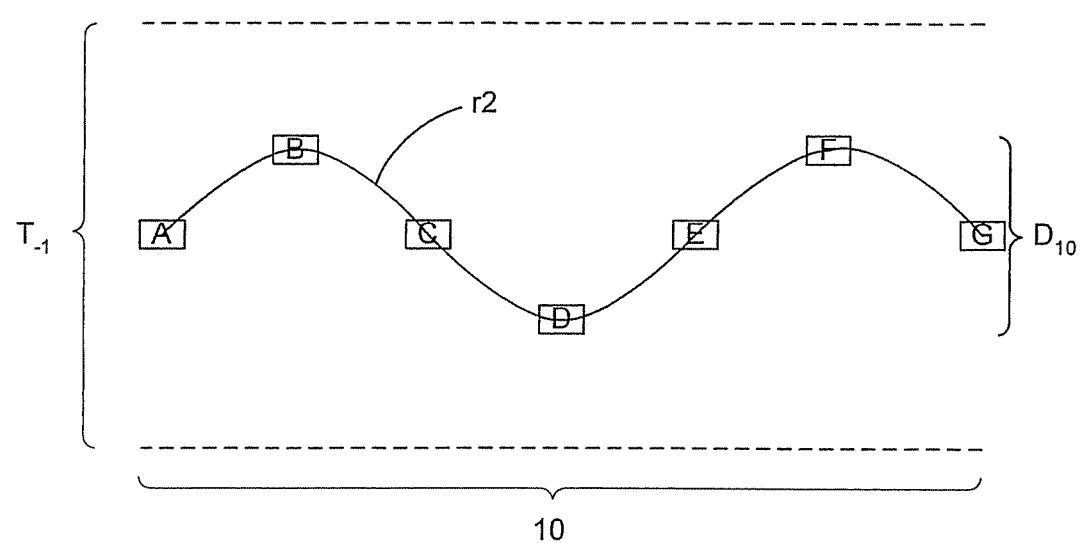
FIG. 9 is an enlarged plan view of one of the tracks depicted in FIG. 9, schematically depicting the movement of the head relative to the illustrated track at one of the measurement locations.

Referring for a moment to FIGS. 8 and 9, one simplified example of the operation of the servo system 220 in the calibration mode 220a will be described. In particular, FIGS. 8 and 9 illustrate the effects of an example of the servo system 220 operating under the influence of both the first calibration signal "r1" and the second calibration signal "r2".

Referring initially to FIG. 8 of the drawing, depicted therein are broken lines schematically representing the boundaries between radially adjacent calibration tracks. The term "calibration tracks" is not used herein to suggest that the tracks depicted in FIG. 8 are any different than any of the other tracks T on the disk surface 26. Instead, the term "calibration tracks" simply refers to the fact that the gain calibration systems and methods described herein only requires data to be read from only a few of the tracks T.

The spaces between these broken lines represent the calibration tracks, and the calibration tracks are labeled $T_{+5}$, $T_{+4}$, $T_{+3}$, $T_{+2}$, $T_{+1}$, $T_C$, $T_{-1}$, $T_{-2}$, $T_{-3}$, $T_{-4}$, and $T_{-5}$. The track $T_C$ is the center track among the illustrated tracks, and the positive numbers indicate tracks spaced radially outwardly from the center track $T_C$, while the negative numbers indicate tracks spaced radially inwardly from the center track $T_C$. The exact location of the center track $T_C$ on the recording surface 26 is not critical, but the location of the center track $T_C$ is ideally a location where PES non-linearities are expected to be low.

For illustrative purposes, boxes labeled "1" through "24" in FIG. 8 indicate locations on the recording surface 26 at which calibration measurements are taken. These locations are further associated with different ranges of time during the overall calibration process. The overall calibration process is, however, continuously performed while the system 220 is in the calibration mode 220*a* as suggested by the curve "r1". The boxes "1" through "24" thus illustrate periodic snapshots of the calibration process and are not intended to imply that a system constructed in accordance with the principles of the present invention requires the use of a sequence of discrete, physically spaced calibration locations.

FIG. 8 illustrates that the calibration measurements are taken across multiple tracks, with the pattern and frequency of movement of the head 18 as determined by the first calibration signal "r1". The example first calibration signal "r1" represented in FIG. 8 causes measurements to be taken at eleven different tracks. However, the number of tracks at which measurements are taken should be within a first range of between 5 and 15, a second preferred range of substantially between 3 and 20, and in any event should be within a third predetermined range of at least 2 tracks.

Referring now to FIG. 9 of the drawing, depicted therein is a detail of the measurement process identified as box "10" in FIG. 8. In particular, FIG. 9 illustrates movement of the head 18 caused by the second calibration signal "r2". At the time of the measurement process "10", the head 18 is located adjacent to the center track $T_{-1}$, so FIG. 9 schematically represents, between two broken lines, the center track of $T_{-1}$. The boxes in FIG. 9 are labeled "A" through "G" and illustrate locations of the head 18 within the track $T_{-1}$ at locations where the PES signal is sampled during the portion of the calibration process represented by box "10" in FIG. 8. The boxes "A" through "G" are associated with different points in time during a particular calibration measurement. Again, the calibration process is or may be continuous, but the boxes "A" through "G" represent sampling of PES at a discrete points in time during a single calibration measurement. A stroke value $D_{10}$ represents the distance traversed by the head under the influence of the second calibration signal "r2" during the portion of the measurement process represented by box "10" in FIG. 9.

Stroke values are similarly calculated throughout the calibration process through the tracks at which calibration measurements are taken during the calibration process. As is generally known in the art, the calibration factor may be generated by measuring the stroke value and correlating the stroke value with the magnitude of the second calibration signal "r2".

In a typical implementation of the servo system 220, the system 220 may sample the PES several times to obtain each calibration measurement, with the overall calibration process requiring thousands or tens of thousands of calibration measurements. The exact number of calibration measurements and/or samples taken is a tradeoff between accuracy and the time that the servo system 220 is operating in the calibration mode 220*a*.

The example calibration system 234 generates the calibration factor by averaging the results of a predetermined number of calibration measurements. As an alternative, the number of calibration measurements and/or samples required may be determined by comparing the results of the successive calibration measurements and ending the measurement process when this comparison indicates that the change in the calculated calibration factor falls below an acceptable level.

Using the servo system 220 in the calibration mode 220*a* as described above thus minimizes the effects of non-linearities arising from burst alignment anomalies on the gain measurements because the PES is not generated based on servo bursts associated with a single track.

Figure 10:
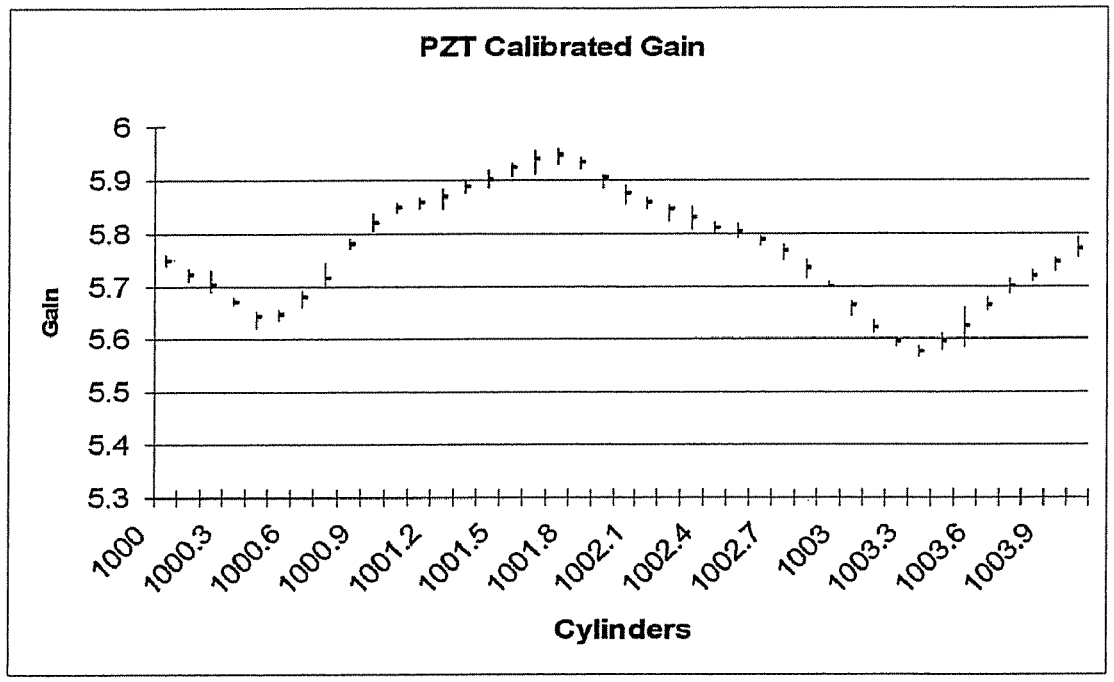
FIG. 10 is a plot of gain against cylinders illustrating gain variations for a conventional gain calibration system for the second stage of a dual stage actuator of a hard disk drive.
Figure 11:
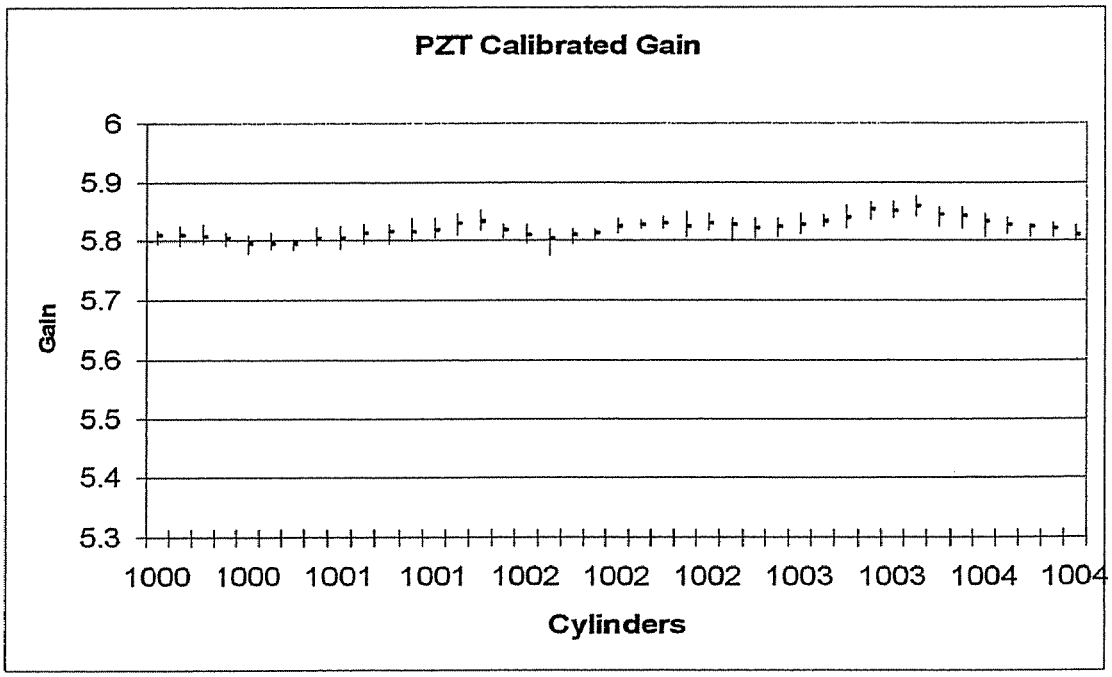
FIG. 11 is a plot of gain against cylinders illustrating gain variations for an example gain calibration system for the second stage of a dual stage actuator of a hard disk drive constructed in accordance with the principles of the present invention.

Referring now to FIGS. 10 and 11, depicted therein is a comparison of gain measured at multiple points along a single track and gain measurements measured across a plurality of tracks according to the principles of the present invention. The plots of FIGS. 10 and 11 were taken under the same operating conditions.

FIG. 10 contains a plot of gain values calculated for a number of different cylinders, where the gain values are calculated by performing measurements on only one track. FIG. 10 illustrates that the gain values vary by as much 10%. The gain values may vary by as much as 25-30% under more extreme situations, such as when the read head is narrower or when localized squeeze is present.

FIG. 11, on the other hand, plots gain values calculated for a number of different cylinders using the techniques of the present invention. As shown in FIG. 11, the gain values differ by only approximately 1%. Even under more extreme conditions, the difference in gain values is still expected to be significantly less than the differences in gain values illustrated in FIG. 10.

The exact parameters of the first calibration signal "r1" and the second calibration signal "r2" are not critical to the principles of the present invention. The example calibration signals "r1" and "r2" are periodic signals. Further, for ease of implementation, the example calibration signals "r1" and "r2" are sinusoidal signals.

The exact frequencies of the calibration signals "r1" and "r2" are also not critical to the principles of the present invention; however, a frequency of the example second calibration signal "r2" should be different from that of the first calibration signal "r1" to allow the effects of the second calibration signal "r2" on the servo system 220 to be distinguished from the effects of the first calibration signal "r1".

In particular, if periodic signals are used as the first and second calibration signals "r1" and "r2", the frequency of the second calibration signal "r2" should be higher than that of the first calibration signal "r1". With the frequency of "r2" higher than the frequency of "r2", measurements (such as depicted at "A" through "G" in FIG. 9) may to be taken at each of the measurement locations (such as depicted at "1" through "24" in FIG. 8).

A ratio of the example second calibration signal "r2" to that of the first calibration signal "r1" is approximately 21:1 in the example servo system 220. However, the ratio of the second signal "r2" to the first signal "r1" may be within a first predetermined range of from approximately 10:1 to approximately 100:1 or a second predetermined range of from at least 5:1 to approximately 1,000:1, but in any event should be within a third predetermined range of at least 2:1.

As a matter of convenience, the example first calibration signal "r1" is formed by a "1F" signal already available to the servo system 220. The "1F" signal is a multiple of the power supply frequency and is a factor of the rotational speed of the spindle. In the example of a 7200 RPM spindle speed, the calibration signal "r1" is a sinusoidal signal having a frequency of 120 Hz. The example second calibration signal "r2" is also a sinusoidal signal, but has a frequency of approximately 2500 Hz, which, again as a matter of convenience, is close to the targeted cross-over frequency of the demodulator conventionally used to obtain the PES signal.

When the servo system 220 operates in the calibration mode, the head position "Y" is a function of the first and second stages 230 and 232 as stimulated by the calibration signals "r1" and "r2" and may be represented by the following formula:

$$Y = \underbrace{r1 \cdot \frac{C_v P_v}{1 + C_v P_v}}_{A} + \underbrace{r2 \cdot \frac{P_\mu}{1 + C_v P_v}}_{B} \quad (1)$$

where $C_v$ represents the first controller 240, $P_v$ represents the VCM 50, and $P_\mu$ represents the PZT 52.

The term "A" in formula (1) represents a component of the head position "Y" associated with the first calibration signal "r1", while the term "B" in formula (1) represents a component of the head position "Y" associated with the second calibration signal "r2". Typically, the "A" component is a relatively low frequency component having relatively large amplitude, while the "B" component is a relatively high frequency component.

The following formulas represent the motion Y1 of the VCM 50, the motion Y2 of the PZT (microactuator) 52, and the position error signal perr.

$$Y_1 = r1 \cdot \frac{C_v P_v}{1 + C_v P_v} - r2 \cdot \frac{P_\mu}{1 + C_v P_v} \quad (2)$$

$$Y_2 = r2 \cdot P_\mu \quad (3)$$

$$perr = \underbrace{r1 \cdot \frac{1}{1 + C_v P_v}}_{A} + \underbrace{r2 \cdot \frac{P_\mu}{1 + C_v P_v}}_{B} \quad (4)$$

The component "A" of the formula (4) represents the effects of the first calibration signal "r1" on the position error signal perr, while the component "B" of the formula (4) represents the effects of the second calibration signal "r2" on the position error signal perr.

In one form of the invention, the calibration system 234 generates the calibration factor by first mathematically removing the component "A" from the position error signal perr. Once the component "A" has been removed from the position error signal perr, the calibration system 234 generates the calibration factor by performing a Discrete Fourier Transform (DFT) on the component "B" of the position error signal perr at the frequency of the second calibration signal "r2" and dividing a result of the DFT by the magnitude of the second calibration signal "r2". The calibration factor so generated may be used to calibrate the PZT (microactuator) gain as will be described in further detail below.

In an alternate form of the invention, the optional ARC system 244 may be activated while the servo system 220 is in the calibration mode 220a. In this case, the ARC system compensates for the effects of the first calibration signal "r1" and eliminates the component "A" of the position error signal formula (4). With the component "A" of formula (4) eliminated by the ARC system 244, the calibration system 234 generates the calibration factor by performing a DFT on the position error signal perr at the frequency of the second calibration signal "r2" and dividing by the magnitude of the second calibration signal "r2". Again, the calibration factor may be used to calibrate the PZT (microactuator) gain.

Referring now back to FIG. 7, when in the operating mode 220b, the servo system 220 is configured to comprise first and second stages 260 and 262 and first, second, and third summers 264, 266, and 268. In this operating mode 220b, the first stage 260 comprises a first controller 270 and the VCM 50, while the second stage 262 comprises a second controller 280, an estimator 282, a calibrate block 284, and the PZT 52. Optionally, an ARC block 290 and third summer 292 are arranged to modify an input to the first controller 270 with an ARC signal.

When in the operating mode 220b depicted in FIG. 7, the servo system 220 allows the hard disk drive 10 to perform seek and track following (read/write) processes. The basic operation of the servo system 220 in the operating mode 220b is or may be conventional and will not be described herein in detail beyond what is required for a complete understanding of the present invention.

When the servo system 220 is in the operating mode 220b, the calibrate block 284 is arranged to alter the parameters of the system 220 based on the calibration factor. For example, the calibrate block 284 may multiply the output of the second controller 280 by a constant (e.g., "1") when no calibration is required, and this constant is modified (e.g., "1.5" or "0.75") based on the calibration factor as required. When the output of the second controller 280 is modified using the gain correction factor, the gain of the second stage 262 is calibrated, and the bandwidth and stability of the servo system 220 are significantly improved. However, the parameters of the servo system 220 may be altered in ways other than that depicted in FIG. 7 to calibrate the second stage 262 of the servo system 220 operating in the operational mode 220b.

The scope of the present invention should be determined with respect to the following claims and not the foregoing detailed description.

We claim:

1. A servo system for a hard disk drive comprising a first actuator, a second actuator, a head, and a disk on which is formed a plurality of tracks containing servo data, comprising:
   a first stimulus that causes the first actuator to move the head to at least two calibration tracks on the disk;
   a second stimulus that causes the second actuator to move the head relative to the at least two calibration tracks; and
   a calibration system for generating a calibration factor based on the second stimulus and the movement of the second actuator relative to each of the at least two calibration tracks,
   wherein the calibration factor is computed from a position error signal, resulting from the movement of the second actuator relative to each of the at least two calibration tracks, based on servo bursts associated with both of the at least two calibration tracks.

2. A servo system as recited in claim 1, in which the first stimulus causes the first actuator to move the head to the at least two calibration tracks in a pattern.

3. A servo system as recited in claim 1, in which the second stimulus causes the second actuator to move the head relative to the at least two calibration tracks in a first pattern.

4. A servo system as recited in claim 2, in which the second stimulus causes the second actuator to move the head relative to the at least two calibration tracks in a second pattern.

5. A servo system as recited in claim 1, in which the first stimulus is periodic.

6. A servo system as recited in claim 1, in which the second stimulus is periodic.

7. A servo system as recited in claim 6, in which a frequency associated with the second stimulus is different from a frequency associated with the first stimulus.

8. A servo system as recited in claim 7, in which a frequency associated with the second stimulus is greater than a frequency associated with the first stimulus.

9. A servo system as recited in claim 8, in which a ratio of a frequency associated with the second stimulus to a frequency associated with the first stimulus is within a range of approximately 10:1 to approximately 100:1.

10. A servo system as recited in claim 8, in which a ratio of a frequency associated with the second stimulus to a frequency associated with the first stimulus is within a range of at least 5:1 to approximately 1,000:1.

11. A servo system as recited in claim 8, in which a ratio of a frequency associated with the second stimulus to a frequency associated with the first stimulus is at least 2:1.

12. A servo system as recited in claim 1, in which the first stimulus causes the first actuator to move the head to substantially between 2 and 20 calibration tracks on the disk.

13. A servo system as recited in claim 1, in which the first stimulus causes the first actuator to move the head to substantially between 3 and 15 calibration tracks on the disk.

14. A servo system as recited in claim 1, further comprising an adaptive runout compensation system.

15. A servo system as recited in claim 1, in which the first actuator operates in a closed loop configuration.

16. A servo system as recited in claim 1, in which the second actuator operates in an open loop configuration.

17. A servo system as recited in claim 15, in which the second actuator operates in an open loop configuration.

18. A servo system as recited in claim 1, in which the calibration system generates the calibration factor based on a portion of the position error signal associated with the second stimulus.

19. A servo system as recited in claim 18, in which the calibration system removes a portion of the position error signal associated with the first stimulus.

20. A servo system as recited in claim 18, further comprising an adaptive runout compensation system, where the adaptive runout system removes a portion of the position error signal associated with the first stimulus.

21. A servo system as recited in claim 18, in which the calibration system performs a Discrete Fourier Transform on the portion of the position error signal associated with the second stimulus based on a frequency of the second stimulus and divides a result of the Discrete Fourier Transform by a magnitude of the second stimulus.

22. In a hard disk drive comprising a first actuator, a second actuator, a head, and a disk on which is formed a plurality of tracks containing servo data, a method of calibrating a gain of the second actuator comprising the steps of:

applying a first stimulus to the first actuator to move the head to at least two calibration tracks on the disk;

applying a second stimulus to the second actuator to move the head relative to the at least two calibration tracks; and generating a calibration factor based on the second stimulus and the movement of the second actuator relative to each of the at least two calibration tracks, wherein the calibration factor is computed from a position error signal, resulting from the movement of the second actuator relative to each of the at least two calibration tracks, based on servo bursts associated with both of the at least two calibration tracks.

23. A method as recited in claim 22, in which the first stimulus causes the first actuator to move the head to the at least two calibration tracks in a pattern.

24. A method as recited in claim 22, in which the second stimulus causes the second actuator to move the head relative to the at least two calibration tracks in a first pattern.

25. A method as recited in claim 23, in which the second stimulus causes the second actuator to move the head relative to the at least two calibration tracks in a second pattern.

26. A method as recited in claim 22, in which the first stimulus is periodic.

27. A method as recited in claim 22, in which the second stimulus is periodic.

28. A method as recited in claim 27, in which a frequency associated with the second stimulus is different from a frequency associated with the first stimulus.

29. A method as recited in claim 28, in which a frequency associated with the second stimulus is greater than a frequency associated with the first stimulus.

30. A method as recited in claim 29, in which a ratio of a frequency associated with the second stimulus to a frequency associated with the first stimulus is within a range of approximately 10:1 to approximately 100:1.

31. A method as recited in claim 29, in which a ratio of a frequency associated with the second stimulus to a frequency associated with the first stimulus is within a range of at least 5:1 to approximately 1,000:1.

32. A method as recited in claim 29, in which a ratio of a frequency associated with the second stimulus to a frequency associated with the first stimulus is at least 2:1.

33. A method as recited in claim 22, in which the first stimulus causes the first actuator to move the head to substantially between 2 and 20 calibration tracks on the disk.

34. A method as recited in claim 22, in which the first stimulus causes the first actuator to move the head to substantially between 3 and 15 calibration tracks on the disk.

35. A method as recited in claim 22, further comprising the step of altering the first stimulus using an adaptive runout compensation signal.

36. A method as recited in claim 22, further comprising the step of operating the first actuator in a closed loop configuration.

37. A method as recited in claim 22, further comprising the step of operating the second actuator operates in an open loop configuration.

38. A method as recited in claim 36, further comprising the step of operating the second actuator in an open loop configuration.

39. A method as recited in claim 22, further comprising the step of generating the calibration factor based on a portion of the position error signal associated with the second stimulus.

40. A method as recited in claim 39, further comprising the step of removing a portion of the position error signal associated with the first stimulus.

41. A method as recited in claim 39, the step of altering the first stimulus using an adaptive runout compensation signal, where the adaptive runout system removes a portion of the position error signal associated with the first stimulus.

42. A method as recited in claim 39, further comprising the steps of:

performing a Discrete Fourier Transform on the portion of the position error signal associated with the second stimulus based on a frequency of the second stimulus; and dividing a result of the Discrete Fourier Transform by a magnitude of the second stimulus.

43. A servo system for a hard disk drive comprising a first actuator, a second actuator, a head, and a disk on which is formed a plurality of tracks containing servo data, comprising:

a calibration mode comprising
a first stimulus that causes the first actuator to move the head to at least two calibration tracks on the disk,
a second stimulus that causes the second actuator to move the head relative to the at least two calibration tracks, and
a calibration system for generating a calibration factor based on the second stimulus and the movement of the second actuator relative to each of the at least two calibration tracks; and
wherein the calibration factor is computed from a position error signal, resulting from the movement of the second actuator relative to each of the at least two calibration tracks, based on servo bursts associated with both of the at least two calibration tracks; and
an operation mode in which the first and second actuators move the head relative to the plurality of tracks based on an input signal and the calibration factor.

44. A servo system as recited in claim 43, in which the first stimulus causes the first actuator to move the head to the at least two calibration tracks in a pattern.

45. A servo system as recited in claim 43, in which the second stimulus causes the second actuator to move the head relative to the at least two calibration tracks in a first pattern.

46. A servo system as recited in claim 44, in which the second stimulus causes the second actuator to move the head relative to the at least two calibration tracks in a second pattern.

47. A servo system as recited in claim 43, in which the first stimulus is periodic.

48. A servo system as recited in claim 43, in which the second stimulus is periodic.

49. A servo system as recited in claim 48, in which a frequency associated with the second stimulus is different from a frequency associated with the first stimulus.

50. A servo system as recited in claim 49, in which a frequency associated with the second stimulus is greater than a frequency associated with the first stimulus.

51. A servo system as recited in claim 50, in which a ratio of a frequency associated with the second stimulus to a frequency associated with the first stimulus is within a range of approximately 10:1 to approximately 100:1.

52. A servo system as recited in claim 50, in which a ratio of a frequency associated with the second stimulus to a frequency associated with the first stimulus is within a range of at least 5:1 to approximately 1,000:1.

53. A servo system as recited in claim 50, in which a ratio of a frequency associated with the second stimulus to a frequency associated with the first stimulus is at least 2:1.

54. A servo system as recited in claim 43, in which the first stimulus causes the first actuator to move the head to substantially between 2 and 20 calibration tracks on the disk.

55. A servo system as recited in claim 43, in which the first stimulus causes the first actuator to move the head to substantially between 3 and 15 calibration tracks on the disk.

56. A servo system as recited in claim 43, further comprising an adaptive runout compensation system.

57. A servo system as recited in claim 43, in which the first actuator operates in a closed loop configuration.

58. A servo system as recited in claim 43, in which the second actuator operates in an open loop configuration.

59. A servo system as recited in claim 57, in which the second actuator operates in an open loop configuration.

60. A servo system as recited in claim 43, in which the calibration system generates the calibration factor based on a portion of the position error signal associated with the second stimulus.

61. A servo system as recited in claim 60, in which the calibration system removes a portion of the position error signal associated with the first stimulus.

62. A servo system as recited in claim 60, further comprising an adaptive runout compensation system, where the adaptive runout system removes a portion of the position error signal associated with the first stimulus.

63. A servo system as recited in claim 60, in which the calibration system performs a Discrete Fourier Transform on the portion of the position error signal associated with the second stimulus based on a frequency of the second stimulus and divides a result of the Discrete Fourier Transform by a magnitude of the second stimulus.

* * * * *

UNITED STATES PATENT AND TRADEMARK OFFICE
CERTIFICATE OF CORRECTION

PATENT NO.        : 7,474,496 B1
APPLICATION NO.   : 11/429427
DATED             : January 6, 2009
INVENTOR(S)       : Yu Sun et al.

It is certified that error appears in the above-identified patent and that said Letters Patent is hereby corrected as shown below:

Col. 11 line 15

Equation 1, delete "$Y = r1 \cdot \underbrace{\frac{C_v P_v}{1+C_v P_v}}_{A} + r2 \cdot \underbrace{\frac{P_\mu}{1+C_v P_v}}_{B}$" and insert -- $Y = r1 \cdot \underbrace{\frac{C_v P_v}{1+C_v P_v}}_{A} + r2 \cdot \underbrace{\frac{P_\mu}{1+C_v P_v}}_{B}$ --

Col. 11 lines 41-42

Equation 2, delete "$perr = r1 \cdot \underbrace{\frac{1}{1+C_v P_v}}_{A} + r2 \cdot \underbrace{\frac{P_\mu}{1+C_v P_v}}_{B}$" and insert -- $perr = r1 \cdot \underbrace{\frac{1}{1+C_v P_v}}_{A} + r2 \cdot \underbrace{\frac{P_\mu}{1+C_v P_v}}_{B}$ --

<u>Column 14</u>

Line 49, delete "operates"

Signed and Sealed this

Seventh Day of July, 2009

JOHN DOLL
*Acting Director of the United States Patent and Trademark Office*